(12) United States Patent
Doi (10) Patent No.: US 6,721,545 B2
(45) Date of Patent: Apr. 13, 2004

(54) MOBILE ELECTRONIC COMMUNICATION DEVICE AND COVERING FOR SIMILAR DEVICES WITH ORNAMENT ATTACHMENT MECHANISM

(75) Inventor: Sayuri Doi, Seattle, WA (US)

(73) Assignee: Wildseed, Ltd., Kirkland, WA (US)

( * ) Notice: Subject to any disclaimer, the term of this patent is extended or adjusted under 35 U.S.C. 154(b) by 0 days.

(21) Appl. No.: 09/932,154

(22) Filed: Aug. 17, 2001

(65) Prior Publication Data

US 2002/0173279 A1 Nov. 21, 2002

Related U.S. Application Data

(60) Provisional application No. 60/292,123, filed on May 17, 2001.

(51) Int. Cl.[7] .............................. H04B 1/38; H04M 1/00
(52) U.S. Cl. .............. 455/90.3; 455/575.1; 379/433.01; 379/433.11
(58) Field of Search ............................. 455/90.3, 550.1, 455/557, 568, 575.1; 379/433.01, 433.11, 446, 452, 447; D14/250, 251, 137, 138, 140, 144

(56) References Cited

U.S. PATENT DOCUMENTS

| | | | | |
|---|---|---|---|---|
| 5,383,091 A | * | 1/1995 | Snell | 361/679 |
| 6,243,022 B1 | * | 6/2001 | Furukawa | 340/825.72 |
| D444,454 S | * | 7/2001 | Hanna et al. | D14/138 |
| D451,094 S | * | 11/2001 | Powell | D14/250 |
| 6,352,186 B1 | * | 3/2002 | Endo | 224/254 |
| 6,356,773 B1 | * | 3/2002 | Rinot | 455/568 |
| D456,016 S | * | 4/2002 | Denson | D14/232 |
| 2001/0041545 A1 | * | 11/2001 | Liberman et al. | 45/117 |
| 2002/0086714 A1 | * | 7/2002 | Wang | 455/567 |

\* cited by examiner

*Primary Examiner*—Erika Gary
(74) *Attorney, Agent, or Firm*—Schwabe, Williamson & Wyatt, P.C.

(57) ABSTRACT

A mobile electronics communications device with a housing and an ornament attachment mechanism. The ornament attachment mechanism provides the ability to customize the appearance of the device in a more personal and unique manner. A covering for a mobile electronics communication device with an ornament attachment mechanism provides the ability to customize the appearance of devices that have replaceable coverings in a similar manner. The ornament attachment mechanisms can be realized in a variety of ways including, but not limited to, the housing or body having a hole, a penetrable membrane, an appendage, or an appendage with a ring.

12 Claims, 8 Drawing Sheets

MOBILE ELECTRONIC COMMUNICATION DEVICE AND COVERING FOR SIMILAR DEVICES WITH ORNAMENT ATTACHMENT MECHANISM

CROSS-REFERENCE TO RELATED APPLICATIONS

The present application claims the benefit of U.S. Provisional Patent Application No. 60/292,123, filed May 17, 2001, entitled "METHOD AND APPARATUS FOR PERSONALIZING A MOBILE ELECTRONIC COMMUNICATION DEVICE" which is incorporated herein by reference.

TECHNICAL FIELD OF THE INVENTION

The present invention relates to mobile electronic communication devices, and more particularly, to such a device or the covering for similar devices that can allow the attachment of ornaments so that a more unique or personal look can be achieved.

BACKGROUND

Mobile electronic communication devices, such as cellular telephones, mobile PDAs, pagers and wireless devices, while once rare, have now become a staple of modern life. It is not unusual for a wide variety of people to own such products, from the elderly to the young. When a product becomes standard in society, people may feel the need to express some individuality or uniqueness in the product they personally own.

Currently mobile electronic communication devices offer very little means of creative expression in the look of the device. Most devices come fixed in the color and look of the product with no practical way of changing the appearance. Generally, those mobile electronic communication devices that allow some means of changing the appearance are limited to replacing coverings or the graphic logo on the display. However, even these coverings allow only limited expression.

SUMMARY

In accordance with aspects of the present invention, a mobile electronic communication device having an electronics unit and a housing is provided. In one aspect, the housing includes an ornament attachment mechanism. The ornament attachment mechanism can be used to hang, attach or pin objects such as jewelry, beads or other similar types of ornaments that a user might wish to use to customize the look of the device. The ornament attachment mechanism can be realized in a variety of methods including, but not limited to a housing containing a hole, a penetrable membrane, an appendage, or an appendage with a ring. By allowing such ornaments to be attached to the device, the user can personalize the device in a unique and distinctive manner.

In accordance with other aspects of the present invention, a replaceable covering for use with a mobile communication device includes a body and an ornament attachment mechanism attached to or formed in or on the body. The ornament attachment mechanism of the covering can allow users to customize the look of their mobile electronic communication device in a more personal and distinctive manner as well. The ornament attachment mechanism on the coverings can be realized in a similar variety of methods. As in the previous aspect, these can include, but are not limited to, a covering containing a hole, a penetrable membrane, an appendage, or an appendage with a ring.

In accordance with yet another aspect of the present invention, the mobile electronic communication device includes an antenna with an attachment mechanism formed thereon. The attachment mechanism may also be implemented as a hole, penetrable membrane, appendage or appendage with a ring.

BRIEF DESCRIPTION OF THE DRAWINGS

The present invention is illustrated by way of example and not limitation in the accompanying figures.

DETAILED DESCRIPTION OF THE ILLUSTRATED EMBODIMENTS

Embodiments of a system and method for a mobile electronic communication device with ornament attachment mechanism are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
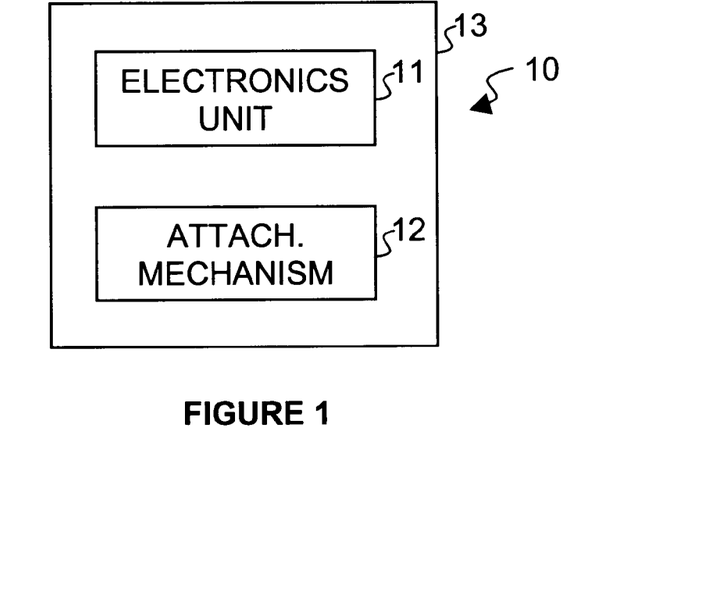
FIG. 1 is a block diagram illustrating the basic components of a mobile electronic communication device according to one embodiment of the present invention.

FIG. 1 illustrates a mobile electronic communication device 10 having an electronics unit 11 (which can include, for example, a transceiver, processor, display, keypad, microphone, speaker, battery, antenna, etc.) and an attachment mechanism 12 contained in a housing 13. Housing 13 can be a base upon which electronics unit 11 and attachment mechanism 12 are mounted. Alternatively, housing 13 can include a replaceable covering upon which attachment mechanism 12 is mounted. Various embodiments of attachment mechanism 12 are described below.

Figure 2:
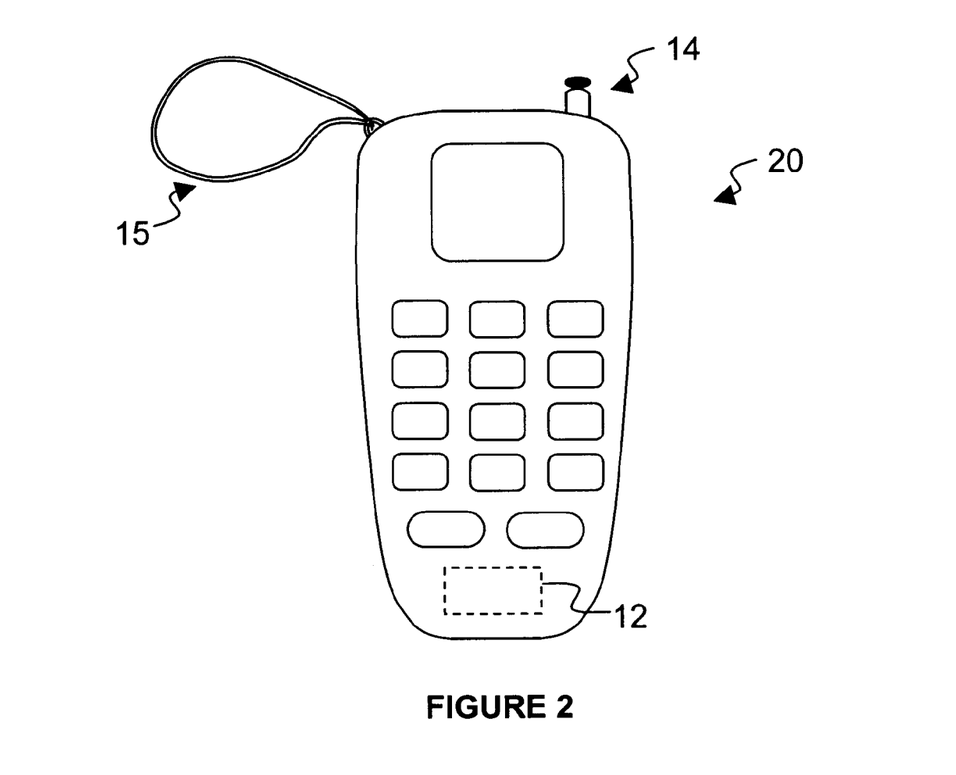
FIG. 2 is a diagram of a cellular phone schematically illustrating an attachment mechanism, according to one embodiment of the present invention.

FIG. 2 illustrates one particular application of the present invention; namely, in a cellular telephone 20. Cellular telephone 20 is similar to known cellular telephones in that it includes a housing and an electronics unit (display, keypad, buttons, antenna, etc.) and a wrist strap 15. Wrist strap 15 is not drawn to scale, but is presented to show the difference between a wrist strap and the attachment mechanism of the present invention. In accordance with the present invention, cellular telephone 20 includes attachment mechanism 12, which is shown in FIG. 2 as a block. Specific embodiments implementing the block are described below in conjunction with FIGS. 3–5. In this exemplary embodiment, attachment mechanism 12 is located at the bottom of the front of cellular telephone 20. In other embodiments, attachment mechanism may be located at other locations on cellular telephone 20. In still other embodiments, the mobile electronic communication device 20 may include more than one attachment mechanism 12 in various locations on the cellular telephone 20.

Figure 3A:
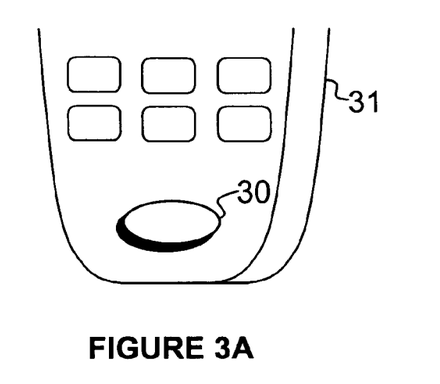
FIG. 3A illustrates one embodiment of the attachment mechanism, a hole, depicted in FIG. 2, according to the present invention.
Figure 3B:
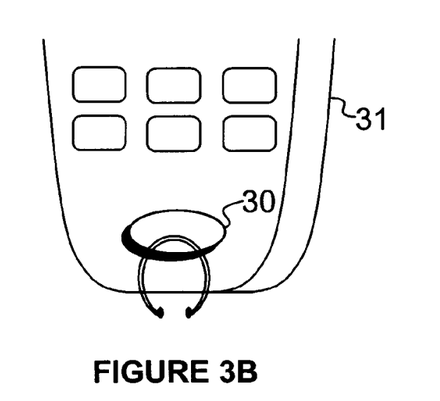
FIG. 3B illustrates a possible use of the attachment mechanism depitcted in FIG. 3, according to one embodiment of the present invention.

Specifically, according to one embodiment of the present invention, FIG. 3A illustrates a close-up of a section of housing 31 that includes attachment mechanism 12. This embodiment of attachment mechanism 12 is implemented in the form of a hole 30 in housing 31. Hole 30 is formed into housing 31. In the one embodiment, hole 30 is formed completely through housing 31. For example, housing 31 can be molded with hole 30. In one embodiment, the perimeter of hole 30 is completely enclosed within housing 31 with no gaps. Hole 30 could be large enough to permit the attachment or tying of ornaments such as, for example, hoop earrings, bracelets, necklaces, or beaded strings. Such objects, depending on their length, could then dangle or hang in any manner the user desired, as illustrated in FIG. 3B. The opening of hole 30 can be at least three millimeters in diameter in order to allow an ornament to be easily inserted. In an embodiment where the opening is greater than seven millimeters depth, the opening can have a width of at least four millimeters wide (width can refer to diameter for circular openings) to accommodate the curved nature of some types of ornaments. In one embodiment, the opening can be four millimeters by nine millimeters, and nine millimeters deep. In one embodiment, the opening provides a straight line of sight between the front end of the opening and the back end of the opening, in order that a linear object, such as a straight pin, may be inserted through the opening without having to bend the object. In other embodiments, hole 30 can have different shapes (e.g., elliptical, rectangular, irregular).

Figure 3C:
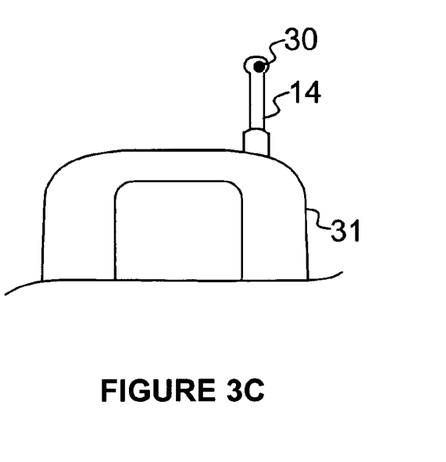
FIG. 3C illustrates another embodiment of the attachment mechanism, a hole in an antenna, according to the present invention.

In an alternate embodiment, hole 30 may have a gap fitted with a latch or clip that when opened allow users to place rings or other similar ornaments into hole 30. The user can then close the latch or clip to lock the rings or other similar ornaments into hole 30. Although hole 30 is shown at the bottom of housing 31, in other embodiments hole 30 can be formed at the top, bottom, or sides of the device. In another embodiment, hole 30 may be formed into antenna 14, as shown in FIG. 3C. In still other embodiments, mobile electronic communication device 10 (FIG. 1) may include more than one hole 30 to serve as attachment mechanisms.

Figure 4:
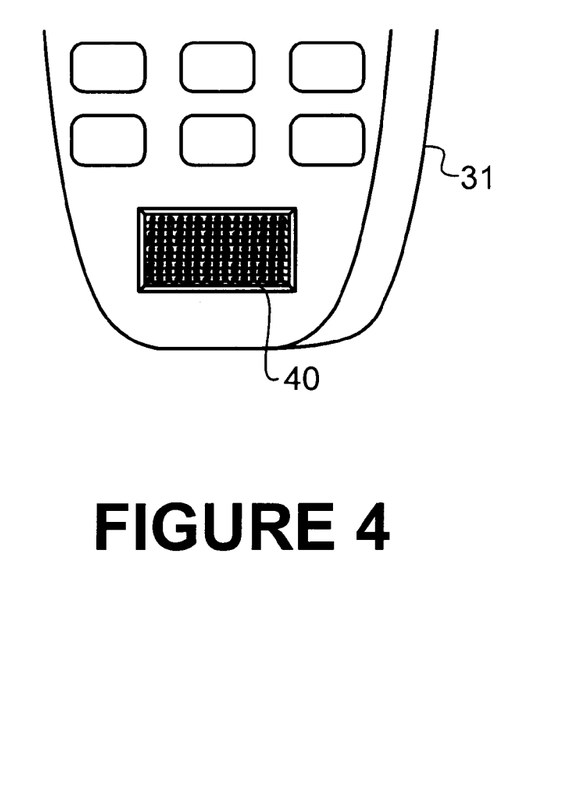
FIG. 4 illustrates another embodiment of the attachment mechanism, a penetrable membrane, depicted in FIG. 2, according to the present invention.

FIG. 4 shows an implementation of ornament attachment mechanism 12 in accordance with another embodiment of the present invention. In this embodiment, the housing 31 includes a penetrable membrane 40, which serves as attachment mechanism 12. In operation, for example, a user can pierce penetrable membrane 40 with an earring or pin to attach the earring or pin onto mobile electronic communication device 10 (FIG. 1). In one embodiment, penetrable membrane 40 is implemented with a resilient material such as a rubber, a plastic or other elastomeric material. In other embodiments, penetrable membrane 40 can be implemented with penetrable materials such as, for example, foam, elastomeric, vinyl, mesh, fiber matting, cork, leather, felt, or cloth. As described in the present disclosure, penetrable membrane 40 can be made out of a variety of materials that can be pierced with ornaments without tearing or falling apart to securely attach ornaments. In some embodiments, penetrable membrane 40 can be resilient enough to permit a user to stretch and lift penetrable membrane 40 so that a user can pierce penetrable membrane 40 with an earring post or a pin and then attach a backing or clasp to the post or pin to securely attach the ornament. In other embodiments, penetrable membrane 40 may be relatively thick and firm to allow the user to pin an ornament into penetrable membrane 40 without the use of a backing or clasp. Although penetrable membrane 40 is shown at the bottom of housing 31, in other embodiments penetrable membrane 40 can be formed at the top, bottom, or sides of the device. In another embodiment, penetrable membrane 40 may be formed in or attached to antenna 14 (FIG. 2). In one embodiment, penetrable membrane 40 can be at least three millimeters in diameter in order to allow an ornament to be inserted through it. In some embodiments, penetrable membrane 40 can have a width of four millimeters (width can refer to diameter for circular membranes). In one embodiment, penetratable membrane 40 can be on the exterior of the device.

Figure 4A:
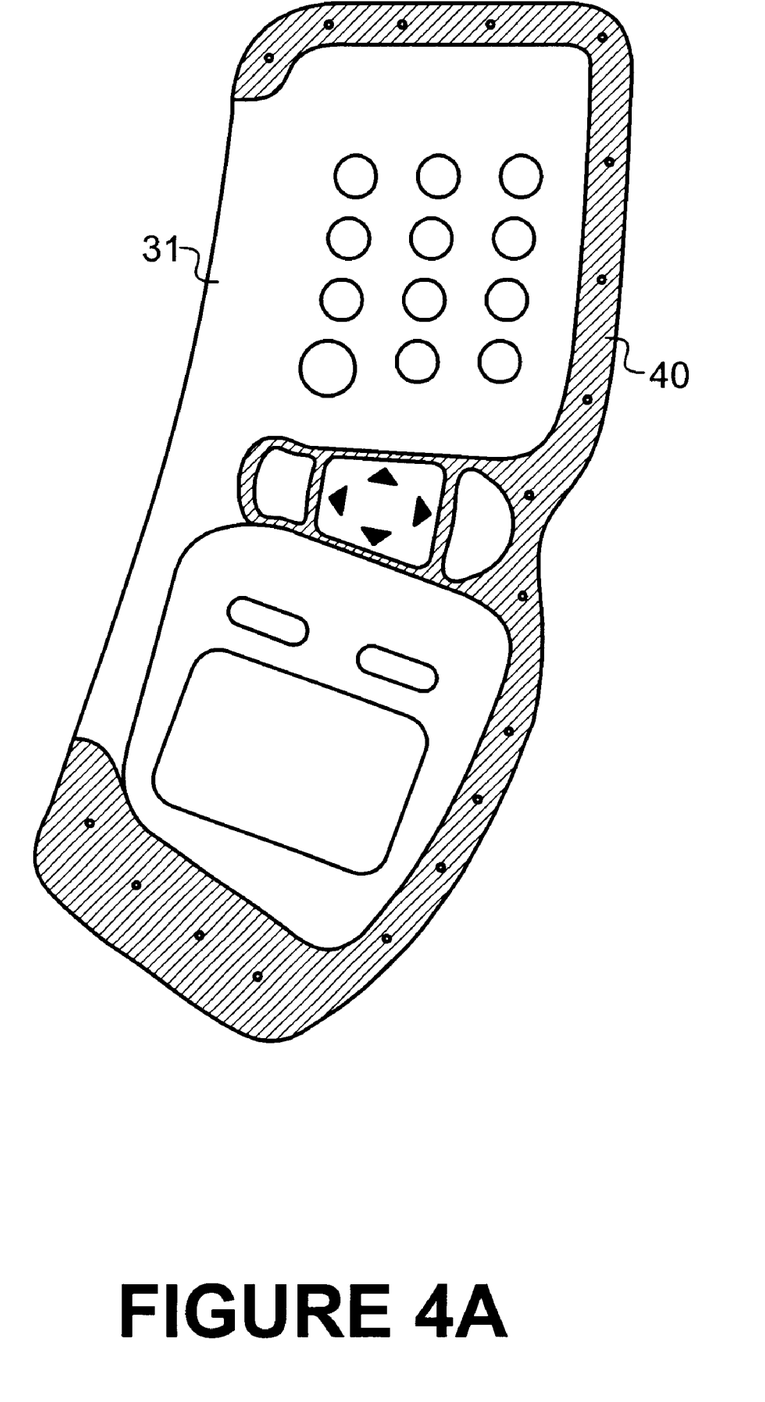
FIG. 4A illustrates another embodiment of the penetrable membrane, depicted in FIG. 4, according to the present invention.

In an embodiment, penetrable membrane 40 is disposed on the perimeter of mobile electronic communication device 10 (FIG. 1) and has a rigid or semi-rigid member surrounding penetrable membrane 40 preventing the ornament from tearing through penetrable membrane 40 and separating from mobile electronic communication device 10 (FIG. 1). For example, covering 60 can be a rubber molding that is conformally fitted around the front back, and sides of mobile electronic communication 10, as shown in FIG. 4A. In a further refinement of this embodiment, covering 60 can also be marked to indicate suitable locations on covering 60 for attaching ornaments.

In other embodiments, housing 31 can have an opening or hole with penetrable membrane 40 attached to housing 31 to cover or to be interested into the opening. Penetrable membrane 40 can have any suitable shape. For example, penetrable membrane 40 can have a geometric shape (e.g. a circle, ellipse, rectangle, etc.) or body part shape, such as a nose, earlobe, etc. The user can attach ornaments to the membrane as described above, inserting the ornament into or through the covering and the opening in the housing 31.

Figure 5:
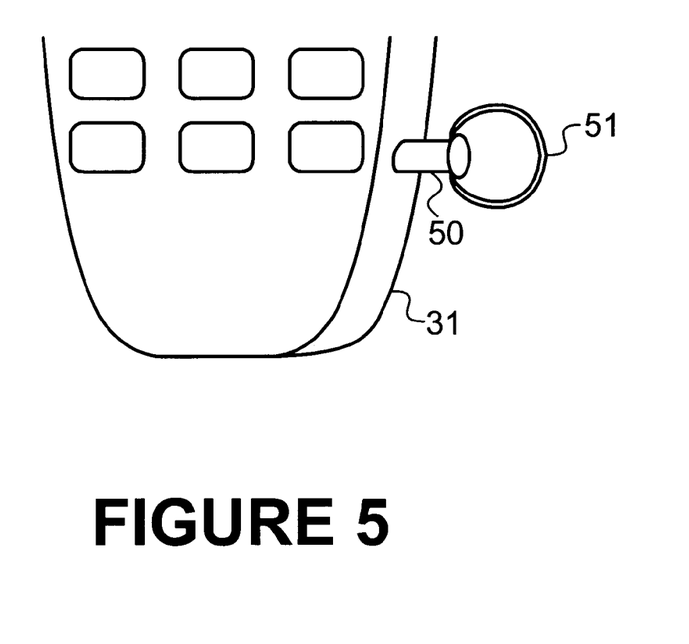
FIG. 5 illustrates another embodiment of the attachment mechanism, an appendage with a ring, depicted in FIG. 2, according to the present invention.

FIG. 5 shows another embodiment of attachment mechanism 12, in accordance to the present invention. In this embodiment, the attachment mechanism includes a ring 51 and an appendage 50 formed on the housing of the mobile electronic communication device. With appendage 50 and ring 51, a user may attach ornaments onto ring 51 in a similar manner as described in conjunction with FIGS. 3A–3C. In one embodiment, ring 51 may be implemented using any suitable closed loop structure such as a carabiner, a key ring, or loop of arbitrary shape. Ring 51 can be made from any material that is strong enough for securely attaching ornaments (e.g., metals, fibers, plastics, etc.).

In other embodiments, appendage 50 may not include ring 51. For example, a user may clip or hang ornaments directly onto appendage 50. This embodiment may be advantageously used for ornaments, such as earrings, broaches or buttons that have a clip rather than a pin or post. In other embodiments, appendage 50 may be formed with a hole to allow the attachment of ornaments. The appendage may also be made from a penetrable material and allow the attachment of ornaments in a manner similar to the embodiments of FIG. 4. Further, in some embodiments, appendage 50 can be formed in a variety of shapes.

Figure 6:
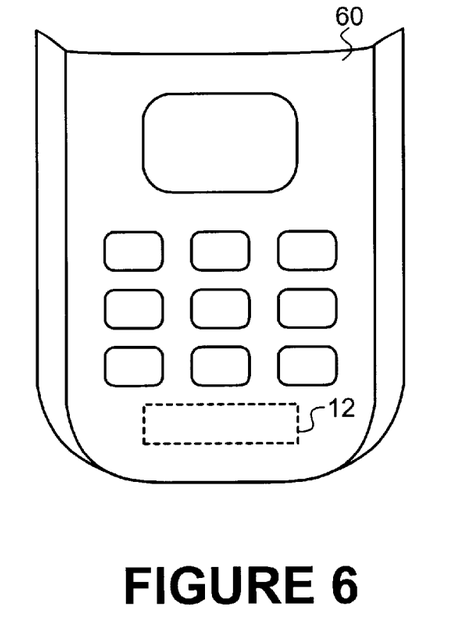
FIG. 6 is a diagram of a mobile phone covering schematically illustrating an attachment mechanism, according to one embodiment of the present invention.
Figure 7:
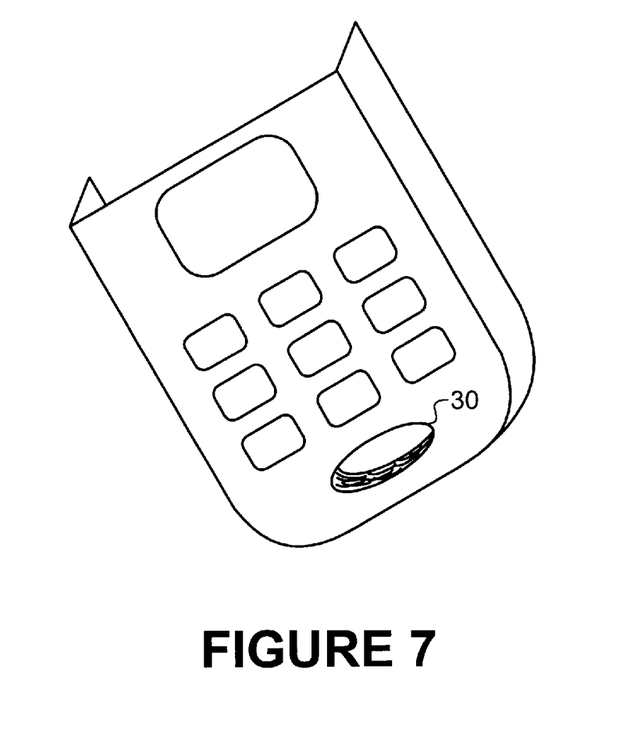
FIG. 7 illustrates one embodiment of the attachment mechanism, a hole, depicted in FIG. 6, according to the present invention.
Figure 8:
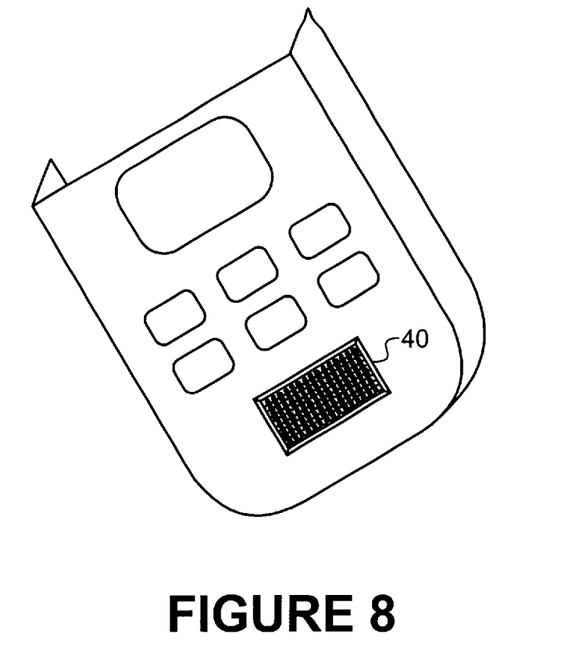
FIG. 8 illustrates another embodiment of the attachment mechanism, a penetrable membrane, depicted in FIG. 6, according to the present invention.
Figure 9:
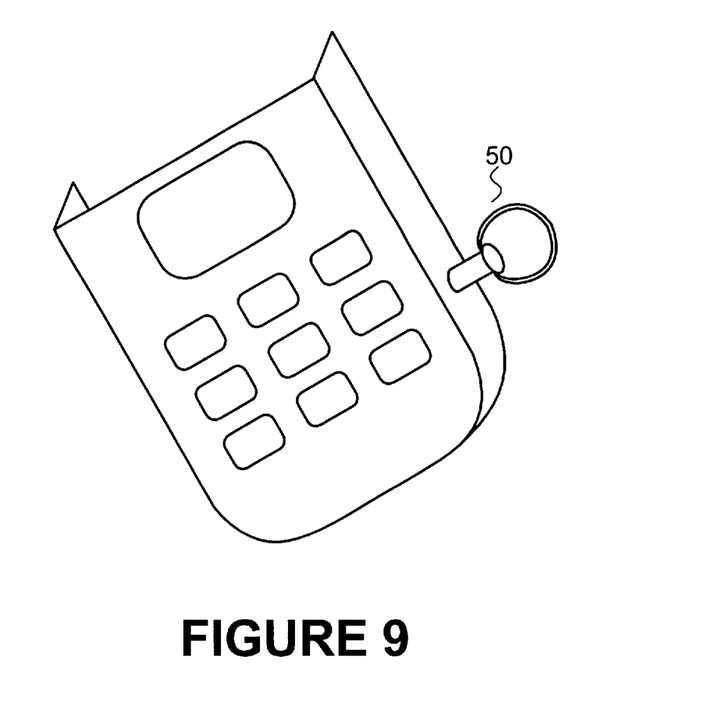
FIG. 9 illustrates another embodiment of the attachment mechanism, an appendage with a ring, depicted in FIG. 6, according to the present invention.

FIG. 6 illustrates another particular application of the present invention; namely, as a covering 60 for use with a mobile electronic communication device. Covering 60 is similar to known coverings in that it allows access to a display, keypad, buttons, etc. of the mobile electronic communication device. However, in accordance with the present invention, covering 60 includes attachment mechanism 12 as described above in conjunction with FIGS. 2–5. For example, FIGS. 7, 8 and 9 respectively illustrate attachment mechanism 12 implemented as a section of covering 60 formed with hole 30 (FIG. 7), penetrable membrane 40 (FIG. 8) and appendage 50 (FIG. 9), which are substantially similar to the respective embodiments described above in conjunction with FIGS. 3, 4 and 5. In one embodiment, covering 60 can be a rubber molding that is conformally fitted around the front, back and/or sides of the mobile electronic communication device. In another embodiment, covering 60 can be a molded faceplate that fits over the front, back or sides of the device.

Figure 10:
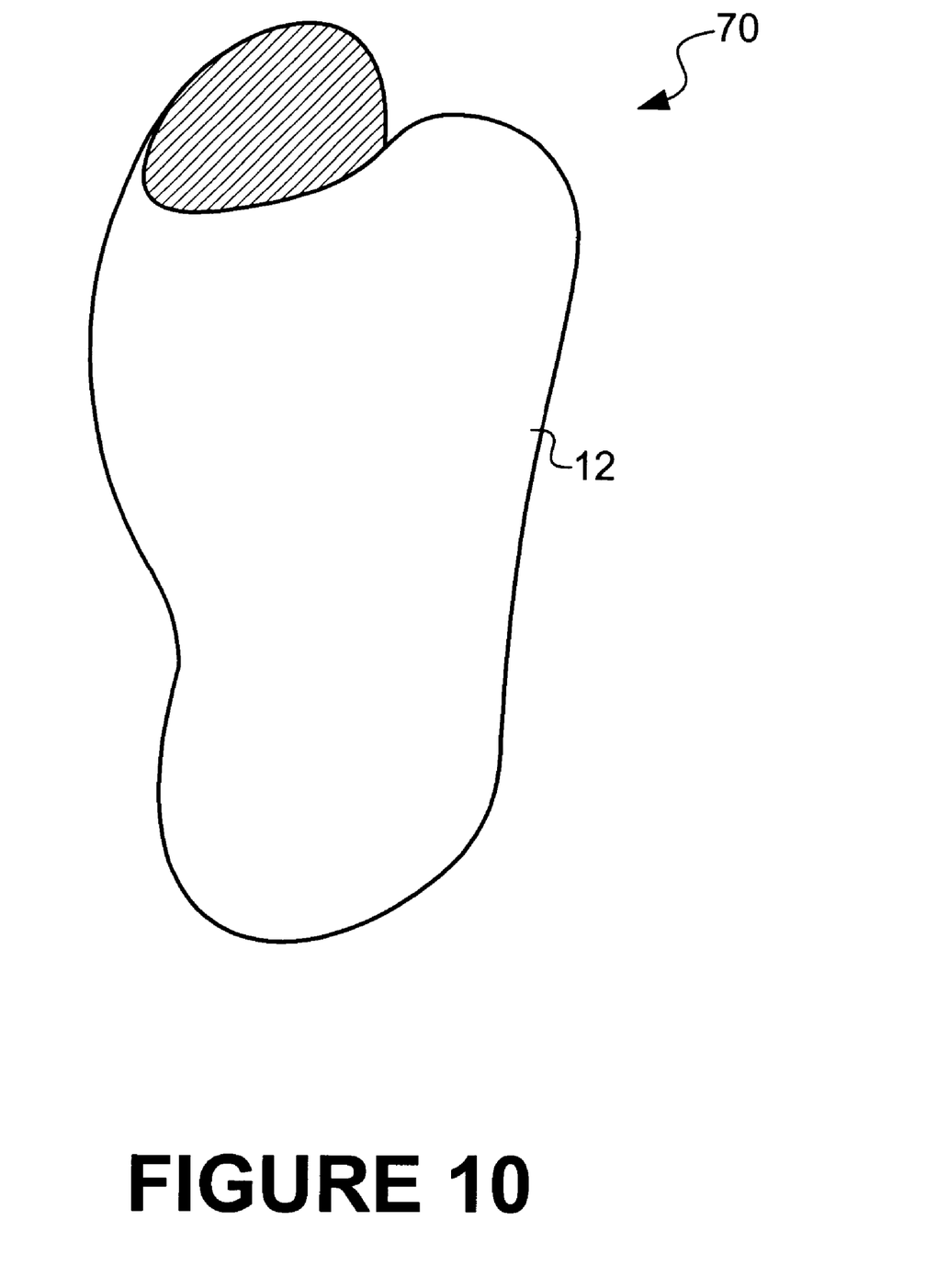
FIG. 10 is a diagram of a pliable molding with the attachment mechanism, according to one embodiment of the present invention.
Figure 11:
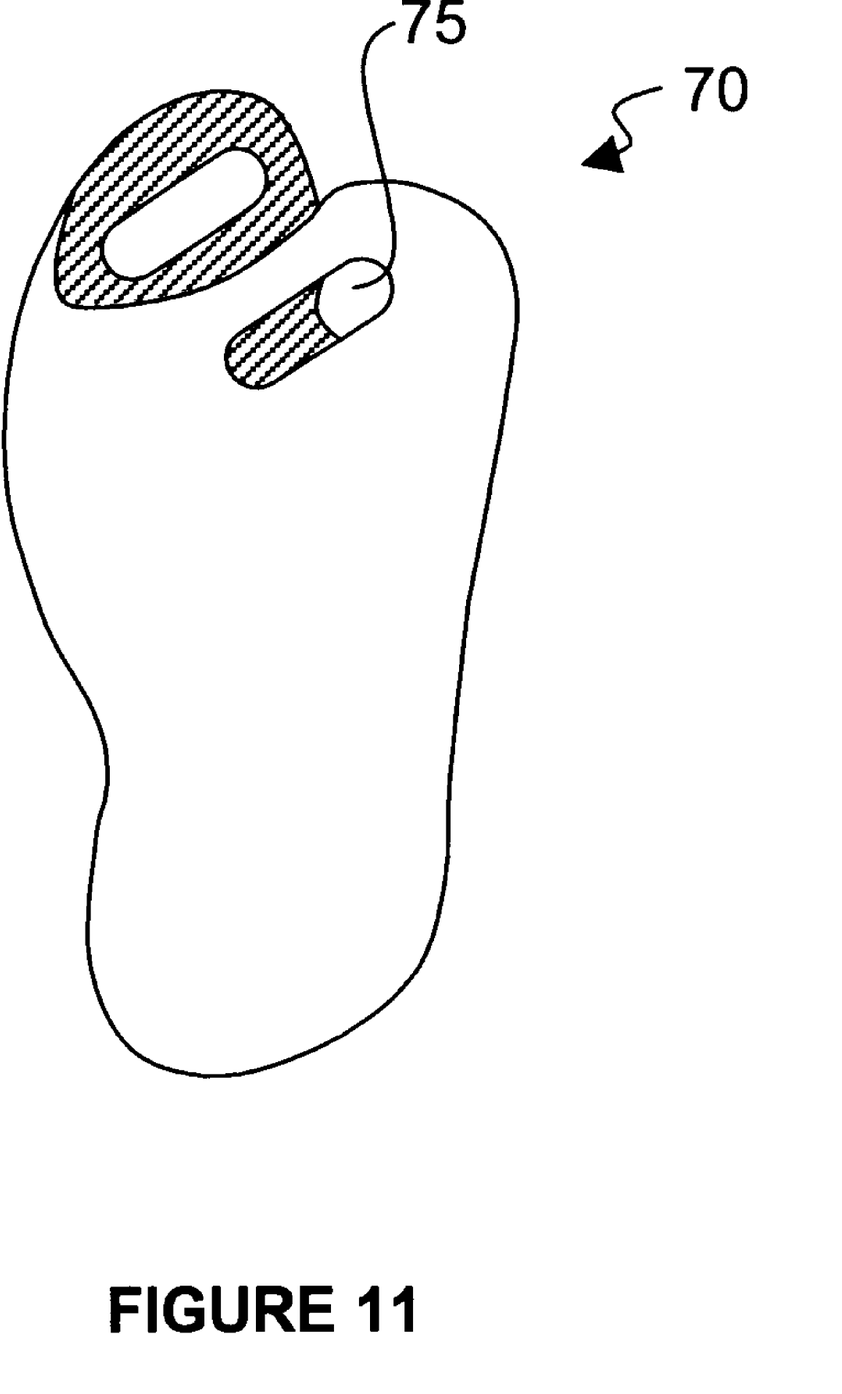
FIG. 11 is a diagram of a pliable molding with the attachment mechanism, according to another embodiment of the present invention.

FIG. 10 illustrates another embodiment of covering of FIG. 6 in which the covering is formed as a pliable molding 70 to be fitted around the housing of a mobile electronic communication device. Pliable molding 70 includes attachment mechanism 12. In one embodiment, pliable molding 70 may be made entirely of a penetrable material such as used to form penetrable membrane 40 (FIG. 4). Thus, in this embodiment, the entire area of pliable molding 70 can serve as attachment mechanism 12. In other embodiments, only certain sections of pliable molding 70 may be made of the penetrable material. For example, pliable molding 70 may be fabricated so that only its edge portions are made of penetrable material. In use, for example, a user can insert the post or pin of an earring into a penetrable material section of pliable molding 70 to attach the earring to the mobile electronic communication device. As previously described for penetrable membrane 40, the penetrable material of pliable molding 70 can be made from, for example, a resilient material such as a rubber, a plastic or other elastomeric material. In an alternative embodiment, pliable molding 70 can include a hole 75 as shown in FIG. 11. Hole 75 can be used to attach ornaments as previously described in conjunction with FIGS. 3A–3C.

These embodiments of the ornament attachment mechanism can allow users to personalize the look of a mobile electronic communication device that can customized with replaceable coverings. In one embodiment, the covering refers to a covering for a mobile electronic communication device that typically serves as a user-replaceable front cover for the mobile electronic communication device. In other embodiments, the covering can be an elastomeric skin or semi-rigid clip that can cover more than just the front face of the mobile electronic communication device. In addition, although a cellular telephone application is described, the term mobile electronic communication device can also refer to pagers, personal digital assistants, notebook computers, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A mobile electronic communication device, comprising:
    an electronics unit; and
    a housing containing the electronics unit, the housing including an ornamental attachment mechanism which has a primary function of facilitating attachment of an ornament to decorate or adorn the mobile electronic communication device,
    wherein the ornamental attachment mechanism comprises a penetrable membrane.

2. The mobile electronic communication device according to claim 1, wherein the membrane has a width of at least three millimeters.

3. The mobile electronic communication device according to claim 1, wherein the membrane is disposed on an exterior surface of the housing.

4. The mobile electronic communication device according to claim 1, wherein the membrane is disposed at least in part on an interior surface a hole of the housing.

5. The mobile electronic communication device according to claim 1, wherein the membrane extends outwardly from the housing.

6. The mobile electronic communication device according to claim 5, wherein the membrane extends outwardly from the bottom of the housing.

7. A mobile electronic communication device, comprising:
    an electronics unit; and
    a housing containing the electronics unit, the housing including an ornamental attachment means primarily for attaching ornaments to decorate or adorn the mobile electronic communication device, wherein the ornamental attachment means primarily for attaching comprises a penetrable membrane.

8. A cellular telephone, comprising:

an electronics unit; and a housing containing the electronics unit, the housing including an ornamental attachment mechanism which has a primary function of facilitating attachment of an ornament to decorate or adorn the cellular telephone, wherein the ornamental attachment mechanism comprises a penetrable membrane.

9. A mobile electronic communication device, comprising:

an electronics unit;

a housing containing the electronics unit; and an antenna coupled to the electronics unit, wherein the antenna includes an ornamental attachment mechanism which has a primary function of facilitating attachment of an ornament to decorate or adorn the mobile electronic communication device, wherein the ornamental attachment mechanism comprises a section of the antenna having a hole.

10. A mobile electronic communication device, comprising:

an electronics unit;

a housing containing the electronics unit; and an antenna coupled to the electronics unit, wherein the antenna includes an ornamental attachment mechanism which has a primary function of facilitating attachment of an ornament to decorate or adorn the mobile electronic communication device, wherein the ornamental attachment mechanism comprises an antenna protruding from the bottom of the device, a section of the antenna having a penetrable membrane, and a rigid support surrounding the membrane.

11. A mobile electronic communication device, comprising:

an electronics unit;

a housing containing the electronics unit; and an antenna coupled to the electronics unit, wherein the antenna includes an ornamental attachment mechanism which has a primary function of facilitating attachment of an ornament to decorate or adorn the mobile electronic communication device, wherein the ornamental attachment mechanism comprises a section of the antenna having a penetrable membrane.

12. A mobile electronic communication device, comprising:

an electronics unit;

a housing containing the electronics unit; and an antenna coupled to the electronics unit, wherein the antenna includes an ornamental attachment mechanism which has a primary function of facilitating attachment of an ornament to decorate or adorn the mobile electronic communication device, wherein the ornamental attachment mechanism comprises a section of the antenna having an appendage and a ring.

* * * * *

UNITED STATES PATENT AND TRADEMARK OFFICE
CERTIFICATE OF CORRECTION

PATENT NO. : 6,721,545 B2
DATED : April 13, 2004
INVENTOR(S) : Sayuri Doi

It is certified that error appears in the above-identified patent and that said Letters Patent is hereby corrected as shown below:

<u>Title page,</u>
Item [75], Inventor, Sayuri Doi, Seattle, WA (US)" should read
-- [75] Inventor: Sayuri Doi, Seattle, WA (US); G. Eric Engstrom, Kirkland, WA (US) --.

Signed and Sealed this

Sixth Day of July, 2004

JON W. DUDAS
*Acting Director of the United States Patent and Trademark Office*